United States Patent [19]
Slinkard et al.

[11] Patent Number: 6,110,998
[45] Date of Patent: Aug. 29, 2000

[54] LATEX COMPOSITIONS CONTAINING A TRIMETHYLOLALKANE MONOCYCLIC FORMAL AS A COALESCING SOLVENT

[75] Inventors: William E. Slinkard; Donald K. Raff, both of Corpus Christi, Tex.

[73] Assignee: Celanese International Corporation, Dallas, Tex.

[21] Appl. No.: 09/075,384

[22] Filed: May 8, 1998

[51] Int. Cl.$^7$ ...................................................... C08J 5/15
[52] U.S. Cl. ........................................... 524/108; 524/340
[58] Field of Search ..................... 524/108, 340

[56] References Cited

U.S. PATENT DOCUMENTS

| | | | |
|---|---|---|---|
| 4,076,727 | 2/1978 | Zey et al. ............................. | 260/240.7 |
| 4,207,155 | 6/1980 | Martin et al. ........................... | 204/159 |
| 4,435,534 | 3/1984 | Jones et al. .............................. | 524/292 |
| 4,489,188 | 12/1984 | Jones et al. .............................. | 524/292 |
| 4,525,512 | 6/1985 | Hudson ..................................... | 524/284 |
| 4,649,170 | 3/1987 | Reid ......................................... | 524/247 |
| 4,876,368 | 10/1989 | Broussard et al. ...................... | 549/374 |
| 5,186,744 | 2/1993 | Bodwell et al. ........................ | 106/243 |
| 5,236,987 | 8/1993 | Arendt ..................................... | 524/287 |

FOREIGN PATENT DOCUMENTS

| | | | |
|---|---|---|---|
| 1597086 | 7/1970 | France .................................... | 542/108 |
| 0597696 | 3/1978 | U.S.S.R. ................................. | 524/108 |

*Primary Examiner*—Peter D. Mulcahy
*Attorney, Agent, or Firm*—M. Susan Spiering

[57] ABSTRACT

A latex containing particles of a film-forming polymer emulsified or suspended in an aqueous medium and a coalescing solvent comprising trimethylolpropane monocyclic formal (TMPMCF) or trimethylolethane monocyclic formal (TMEMCF) is disclosed.

10 Claims, No Drawings

LATEX COMPOSITIONS CONTAINING A TRIMETHYLOLALKANE MONOCYCLIC FORMAL AS A COALESCING SOLVENT

BACKGROUND OF THE INVENTION

1. Field of the Invention

This invention is related to a latex composition containing an agent to aid the coalescence of the emulsified or suspended resin or elastomer particles necessary for the formation of a continuous film.

2. Description of the Related Art Including Information Disclosed Under 37 CFR 1.97 and 1.98

Latex compositions comprising an emulsion or suspension of polymer particles such as resins or elastomers in an aqueous medium, are widely used in various applications, e.g., coatings such as paints and clear coatings, adhesives, and dipping and impregnating compositions. For all or most of these applications, the latex must be capable of forming a strong, adherent and continuous film at a reasonably low temperature. In order to achieve these properties, it is common to incorporate into the latex a coalescing agent which is usually a partial solvent for the polymer, i.e., the resin or elastomer, particles serving as the film forming constituent of the composition. The solvent action of the coalescing agent on the emulsified or suspended particles allows them to coalesce into a strong, adherent and continuous film at a temperature sufficiently low to maintain the utility of the composition for its contemplated applications, e.g., exterior paints which are intended to be suitable for use in cold weather, as well as interior paints which are generally exposed to more moderate temperatures.

The following references may be considered relevant to the invention claimed herein.

U.S. Pat. No. 4,076,727 issued Feb. 28, 1978 to Zey et al. and U.S. Pat. No. 4,207,155 issued Jun. 10, 1980 to Martin et al. disclose the production of monohydroxy monocyclic acetals by reacting a trihydroxy alcohol such as trimethylolpropane or trimethylolethane with an aldehyde such as formaldehyde. The monohydroxy monocyclic acetals are stated to be useful in the synthesis of acrylate and methacrylate esters which are suitable as reactive monomers in the preparation of polymers for coating compositions, particularly those which are UV curable.

U.S. Pat. No. 4,435,534 issued Mar. 6, 1984 to Jones et al., discloses latex coating compositions containing as a coalescent an alkoxyethyl benzoate or similar ester in which a ring hydrogen atom is substituted with an alkyl group, e.g., a toluate.

U.S. Pat. No. 4,489,188 issued Dec. 18, 1984 to Jones et al., has a disclosure similar to that of U.S. Pat. No. 4,435,534 discussed previously except that it also discloses alkoxy 1-methylethyl benzoates and alkyl ring-substituted benzoates as coalescents.

U.S. Pat. No. 4,525,512, issued Jun. 25, 1985 to Hudson, discloses the use of esters of alkyl diglycol ethers with mono- and dicarboxylic acids as coalescing agents in polymer latices employed in paint formulations.

U.S. Pat. No. 4,649,170, issued Mar. 10, 1987 to Reid, discloses a water-based all acrylic, underbody coating containing a coalescing agent such as ethylene glycol or ethylene glycol mono butyl ether.

U.S. Pat. No. 4,876,368, issued Oct. 24, 1989 to Broussard et al., discloses a process for the production of a monohydroxy monocyclic acetal, e.g., trimethylolpropane cyclic formal by reaction of a trihydroxy alcohol, e.g., trimethylolpropane, and an aldehyde, e.g., formaldehyde, including the step of subjecting at least part of a heavier condensation product than the desired cyclic acetal to acetal formation conditions.

U.S. Pat. No. 5,186,744, issued Feb. 16, 1993 to Bodwell et al., discloses, as coalescing agents in water-based protective coating compositions, propoxylated propylene glycol tert. butyl ether (propoxylated PTB) and mixtures of propoxylated PTB with an organic solvent.

U.S. Pat. No. 5,236,987, issued Aug. 17, 1993 to Arendt, discloses the use of benzoate esters containing 8 to 12 carbon atoms in their alcohol moiety, as coalescing agents in latex paint formulations.

SUMMARY OF THE INVENTION

This invention is directed to latices, i.e., water-based compositions comprising an emulsion or suspension of film-forming polymer particles in an aqueous medium, containing a coalescing solvent comprising trimethylolpropane monocyclic formal (TMPMCF) or trimethylolethane monocyclic formal (TMEMCF). Latices containing either of these coalescing solvents have a reduced minimum film forming temperature (MFFT) compared to latices without these coalescing solvents. As an additional benefit, latices containing TMPMCF and TMEMCF have greatly reduced odor compared to latices containing common coalescing agents such as Texanol® and ethylene glycol monobutyl ether.

DESCRIPTION OF THE DRAWINGS

Not applicable.

DETAILED DESCRIPTION OF THE INVENTION

This invention is directed to latices comprising coalescing solvent(s). The compounds which are the coalescing solvents of this invention, viz., trimethylolpropane monocyclic formal (TMPMCF) or 5-ethyl-5-hydroxymethyl-1,3-dioxane; and trimethylolethane monocyclic formal (TMEMCF), or 5-methyl-5-hydroxymethyl-1,3-dioxane, are known in the art and are prepared by reacting trimethylolpropane or trimethylolethane respectively with formaldehyde or a formaldehyde-yielding substance in the presence of an acid catalyst, as more fully discussed in the previously cited U.S. Pat. Nos. 4,076,727; 4,207,155 and 4,876,368.

In accordance with an aspect of the invention, the coalescing solvent comprises TMPMCF containing a minor amount relative to the TMPMCF of 2-ethyl-1,3-propanediol (EPD). By "minor amount" it is meant less than 50%, or there is more TMPMCF than EPD. The weight ratio of TMPMCF to EPD when EPD is present is preferably in the range of about 60:40 to about 98:2. The significance of this embodiment of the invention is that both TMPMCF and EPD are byproducts of the production of trimethylolpropane (TMP) by reaction of n-butylaldehyde and formaldehyde. While it is relatively easy to separate a stream containing TMPMCF and EPD as light ends from the main TMP product, it is difficult and expensive to separate the EPD from the TMPMCF because of the closeness of their boiling points. Thus, the fact that the blend of TMPMCF and EPD obtained from the TMP process can be used as a coalescing solvent without the necessity of separating the two compounds constitutes a substantial and unexpected economic advantage.

The coalescing solvent may be present in the latex composition, in an amount, for example of about 0.5 wt. % to about 50 wt. %, preferably about 2 wt. % to about 25 wt. % based on the weight of the latex as prepared, i.e., before the addition of any adjunct, or other compounding ingredient.

The latices to which the coalescing agents of this invention may be added are well-known in the art and contain emulsified or suspended in an aqueous medium, particles of any of a wide variety of polymers, i.e., resins or elastomers. Thus, the latex may be for example, the product of emulsion polymerization in an aqueous medium of at least one ethylenically unsaturated monomer, e.g., a homopolymer of a single monomer or a copolymer of two or more monomers such as alkyl and alkoxyalkyl acrylates, $C_4$ and higher alkyl methacrylates, vinyl esters of saturated carboxylic acids such as vinyl acetate, monolefins such as ethylene, propylene and butene-1, conjugated dienes such as butadiene and isoprene, and copolymers of one or more of the foregoing monomers with one or more hardening monomers such as styrene, methyl methacrylate, ethoxyethyl methacrylate, acrylonitrile and vinyl chloride.

Latices may be classified into soft and hard categories. "Soft" latices are generally classified as having glass transition temperatures (Tg) at or below ambient temperature, approximately 25° C. Whereas a "hard" latex would generally have a Tg greater than about 25° C. Monomers yielding "soft" acrylic latices are, for example, n-butyl acrylate, n-butyl methacrylate, 2-ethylhexyl acrylate, and 2-ethylhexyl methacrylate. Monomers originally included in "hard" acrylic latices include vinyl acetate, styrene, methyl methacrylate, vinyl chloride, acrylonitrile, ethyl methacrylate, acrylamide, and hydroxyethyl methacrylate.

Other specific latices having varying degrees of hardness in accordance with the invention are, for example, vinyl acrylic latices in which the emulsified or suspended particles are copolymers of vinyl acetate and at least one "soft" acrylic monomer, styrene acrylic latices wherein the particles are copolymers of styrene and at least one "soft" acrylic monomer, and rubber-based latices in which the particles are, for example, a copolymer of butadiene and styrene, or a homopolymer of butadiene.

In the case of copolymers, the relative amount of each monomer used in the polymerization will depend on the properties desired in the final latex.

The latices contemplated under this invention may contain, for example, about 20 wt. % to about 80 wt. %, preferably about 35 wt. % to about 65 wt. % of solids, i.e., polymer, based on the weight of latex as prepared, i.e., before the addition of any compounding ingredients.

Besides the emulsified or suspended polymer particles and the coalescing agent, the latex composition of this invention may also contain any of various adjuncts which are conventionally used in such compositions, e.g. pigments, fillers, dispersants, surfactants, thickeners, plasticizers, antifoaming agents, antimicrobial agents and protective colloids.

The following examples further illustrate the invention.

EXAMPLES 1–4 AND COMPARATIVE EXAMPLES A–H

In these examples and comparative examples, four different commercially available latices containing either no coalescing solvent, or varying amounts of TMPMCF of at least 98 wt. % purity, or a prior art coalescing solvent generally used commercially in latex emulsions were tested for the ability of the coalescing solvent to aid film formation as indicated by the determination of the minimum film formation temperature (MFFT) of each latex. The test was carried out by visual observation of cracking or whitening of the film dried over a substrate, usually a metal bar, having a controlled temperature gradient as described in ASTM D-2354-91, using a CSI Minimum Film Temperature Tester Model CS-188.

In measuring the MFFT of each latex, the coalescing solvent was added to each base latex intended to include such solvent, mixed well and allowed to stand for 24 hours. Just prior to testing each latex of the group, including those containing a coalescing solvent and those not containing such solvent, the temperature gradient was established across the metal bar and allowed to equilibrate until the temperature gradient was constant. The latex emulsion was again mixed well and about 5 ml of the test material placed on the test strip (a flat-bottomed, shallow trough machined in the metal bar), and the latex spread uniformly over the test strip with a straight edge spreader. The latex emulsion was allowed to dry and the point on the bar at which the film became discontinuous (corresponding to a measured temperature) identified and the temperature recorded as the MFFT.

The latex emulsions used as the base stock in the tests were all commercially available materials as described below:

In Example 1 and Comparative Examples A and B, the latex contained as solids about 50 wt. % of a soft, all acrylic latex resin, and had a pH as is of about 8.5–9.0, a viscosity of about 50–400 cps (centipoise), and a specific gravity at 20° C. of about 1.1. The latex is useful for interior architectural paints and is sold as Rhoplex SG-10M® by Rohm and Haas.

In Example 2 and Comparative Examples C and D, the latex contained as solids about 41.5 wt. % of a hard, all acrylic latex resin which was a copolymer of 2-ethylhexyl acrylate and methyl methacrylate, had a pH as is of about 7.6, a viscosity about 200 cps., and a specific gravity at 20° C. of 1.036. The latex is useful for concrete and tile coatings and is sold as Rhoplex WL-91® by Rohm and Haas.

In Example 3 and Comparative Examples E and F, the latex contained as solids about 49 wt. % of a styrene-acrylic resin having a particle size of 0.075 micron. The latex had a pH as is of about 8.5, a viscosity of about 700 cps, a specific gravity at 20° C. of about 1.046, is useful for wood coatings, and is sold as Joncryl 530® by S.C. Johnson.

In Example 4 and Comparative Examples G and H, the latex contained as solids about 50 wt. % of a vinyl acrylic latex resin which was a commercial emulsion copolymer of vinyl acetate and n-butyl acrylate in a weight ratio of 77:23, having a particle size of 0.075 micron. The latex had a pH as is of about 8.5, a viscosity of about 700 cps and a specific gravity at 20° C. of about 1.046, and is useful for interior wall paints.

In each example, the latex contained either no coalescing solvent or varying amounts of TMCMCF of at least 98 wt. % purity; 2,2,4-trimethyl-1,3-pentanediol monoisobutyrate sold by Eastman Chemical as Texanol®; or in Comparative Example D, ethylene glycol mono-n-butyl ether (EG monobutyl ether). The results of the MFFT determinations are shown in Table I.

TABLE IA

Comparative Examples

| EXAMPLE | LATEX RESIN | COALESCING SOLVENT, wt. % | MFFT, °C. |
|---------|-------------|---------------------------|-----------|
| A | soft, all acrylic | None | 17 |
| B | " | Texanol®, 4% | 1–2 |
| C | hard, all acrylic | None | 53 |
| D | " | EG monobutyl ether, 15% | –2 |
| E | styrene acrylic | None | 77 |
| F | " | Texanol®, 21% | 14–15 |
| G | vinyl acrylic | None | 7 |
| H | " | Texanol®, 10% | 0–1 |

TABLE IB

Examples Containing TMPMCF as Coalescing Solvent

| EXAMPLE | LATEX RESIN | COALESCING SOLVENT, wt.% | MFFT, °C. |
|---------|-------------|---------------------------|-----------|
| 1 | soft, all acrylic | TMPMCF, 4% | 0–1 |
| 2 | hard, all acrylic | TMPMCF, 15% | 3 |
| 3 | styrene acrylic | TMPMCF, 21% | <3 |
| 4 | vinyl acrylic | TMPMCF, 10% | 0 |

The results shown in Tables IA and IB indicate that TMPMCF is a very effective coalescing solvent in that it reduces substantially the MFFT's of all the latexes tested, as compared with those obtained when no coalescing solvent was added. Furthermore, the MFFT's obtained with TMPMCF were at least comparable to those obtained with the conventional and widely used coalescing solvents Texanol® and EG monobutyl ether, and in the case of one latex, viz., Joncryl 530®, the MFFT obtained with TMPMCF was significantly lower than that obtained with Texanol® (Example 3 vs. Comparative Example F).

Finally, the latices containing TMPMCF as coalescing solvent had significantly less odor than those containing Texanol® or EG monobutyl ether.

The following examples illustrate the effectiveness of a blend of TMPMCF and 2-ethyl-1,3-propanediol (EPD) as a coalescing solvent for film-forming latices.

EXAMPLES 5 AND 6

In Example 5 the procedure of Example 1 was repeated using Rhoplex SG-10® latex containing 4 wt. % of high purity TMPMCF as a coalescing solvent, while in Example 6, the same procedure was followed except that the coalescing solvent was 4 wt. % of a blend of about 90 wt. % of TMPMCF, about 8 wt. % of EPD and about 2 wt. % of other miscellaneous organic compounds miscible with the TMPMCF and EPD. The MFFT's obtained with the latices of Examples 5 and 6 as compared with that of Comparative Example A containing no coalescing solvent are shown in Table II.

TABLE II

Effect of EPD

| EXAMPLE | COALESCING SOLVENT | MFFT, °C. |
|---------|--------------------|-----------|
| A | None | 17 |
| 5 | TMPMCF | 3–7 |
| 6 | TMPMCF/EPD | 10 |

The results shown in Table II indicate that while a latex containing 4 wt. % of a blend of TMPMCF and EPD as coalescing solvent has an MFFT higher than that of the same latex containing 4 wt. % of high purity TMPMCF, the MFFT of the latex containing such blend is still lower than that of the latex containing no coalescing solvent. This illustrates the usefulness of the TMPMCF/EPD blends as a coalescing solvent for latices.

EXAMPLES 7–10 AND COMPARATIVE EXAMPLES I AND J

These examples illustrate the effectiveness of high purity TMPMCF and a TMPMCF/EPD blend with another latex, viz., one containing as solids about 55 wt. % of a vinyl-acrylic laytex with a particle size of about 0.3 micron and having a viscosity of about 700–1200 cps. The latex is sold as Flexbond 325® by Air Products.

In these examples, the procedure of the previous examples was followed with the latex containing either no coalescing solvent or 2 or 4 wt. % of Texanol®, high purity TMPMCF, or a blend of TMPMCF and EPD as described in Example 6. The identity and amount of coalescing agent present and the MFFT obtained in each example are shown in Tables IIIA and IIIB.

TABLE IIIA

Comparative Examples

| EXAMPLE | COALESCING SOLVENT, wt. % | MFFT, °C. |
|---------|---------------------------|-----------|
| I | None | 14 |
| J | Texanol, 2% | 6 |

TABLE IIIB

Examples Containing TMPMCF/EPD Blends

| EXAMPLE | COALESCING SOLVENT, wt.% | MFFT, °C. |
|---------|---------------------------|-----------|
| 7 | TMPMCF, 2% | 6 |
| 8 | TMPMCF/EPD, 2% | 6 |
| 9 | TMPMCF, 4% | 4 |
| 10 | TMPMCF/EPD, 4% | 4 |

The results shown in Tables IIIA & IIIB indicate that at the 2 wt. % level, Texanol®, high purity TMPMCF, and the TMPMCF/EPD blend each lowers the MFFT of the latex by an equal amount, and at the 4 wt. % level, high purity TMPMCF and the TMPMCF/EPD blend again lowers the MFFT of the latex by an equal amount with the reduction being greater than at the 2wt. % level. Moreover, while the odor of the latex containing the TMPMCF/EPD blend was stronger at both the 2 wt. % and 4 wt. % levels than that of the latex containing high purity TMPMCF, the odor of the latex containing such blend at the 2 wt. % level was perceptibly weaker than that of the latex containing Texanol® as the coalescing solvent.

The invention and examples as described illustrate the effect of TMPMCF and/or TMEMCF as coalescing solvents. Latices having these solvents have shown reduced MFFT and lower odor overall (in the can and on the wall) as compared to latices without these solvents. These latices have various utilities as described herein, in particular in paints and coatings.

We claim:

1. A latex containing particles of a film-forming polymer emulsified or suspended in an aqueous medium and a coalescing solvent comprising trimethylolpropane monocyclic formal (TMPMCF) or trimethylolethane monocyclic formal (TMEMCF).

2. The latex of claim 1 wherein said coalescing solvent is present in an amount of about 0.5 wt. % to about 50 wt. % based on the weight of the latex as prepared.

3. The latex of claim 1 wherein said coalescing solvent comprises TMPMCF.

4. The latex of claim 3 wherein said coalescing solvent is TMPMCF of at least 98 wt. % purity.

5. The latex of claim 3 wherein said coalescing agent is a blend of TMPMCF and a minor amount relative to the TMPMCF of 2-ethyl-1,3-propanediol (EPD).

6. The latex of claim 5 wherein said blend has a weight ratio of TMPMCF to EPD of from about 60:40 to about 98:2.

7. The latex of claim 1 wherein said polymer is an addition polymer of at least one ethylenically unsaturated monomer.

8. The latex of claim 7 wherein said polymer is an all acrylic latex resin.

9. The latex of claim 7 wherein said polymer is a styrene acrylic latex resin.

10. The latex of claim 7 wherein said polymer is a vinyl acrylic latex resin.

* * * * *